(12) United States Patent
Wang et al.

(10) Patent No.: US 8,527,687 B2
(45) Date of Patent: Sep. 3, 2013

(54) MAIN BOARD AND METHOD FOR DYNAMICALLY CONFIGURING PERIPERHAL COMPONENT INTERCONNECT EXPRESS PORTS THEREOF

(75) Inventors: Yan Wang, Jiangsu (CN); Yao Guo, Jiangsu (CN)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 180 days.

(21) Appl. No.: 13/194,572

(22) Filed: Jul. 29, 2011

(65) Prior Publication Data

US 2012/0198110 A1 Aug. 2, 2012

(30) Foreign Application Priority Data

Jan. 28, 2011 (CN) .......................... 2011 1 0032115

(51) Int. Cl.
*G06F 13/00* (2006.01)
(52) U.S. Cl.
USPC .............. 710/301; 710/313; 713/2; 713/100
(58) Field of Classification Search
USPC .................. 710/301, 313, 104; 713/1, 2, 100
See application file for complete search history.

(56) References Cited

U.S. PATENT DOCUMENTS

2012/0079259 A1* 3/2012 Swanson et al. .................. 713/2

FOREIGN PATENT DOCUMENTS

| CN | 2718856 Y | 8/2005 |
| CN | 101807049 A | 8/2010 |

* cited by examiner

*Primary Examiner* — Glenn A Auve
(74) *Attorney, Agent, or Firm* — Rabin & Berdo, P.C.

(57) ABSTRACT

A main board and a method for dynamically configuring PCIE ports thereof. The main board comprises a PCIE slot, a detecting circuit, an ROM, a chipset and a modifying circuit. The chipset comprises a Management Engine controller and several PCIE ports. The chipset has a Management Engine function or a similar function. The detecting circuit detects the PCIE slot to generate a current state parameter. The ROM stores a default configuration data. The modifying circuit coupled between the chipset and the ROM determines whether the default configuration data needs to be modified according to the current state parameter. When the default configuration data needs to be modified, the modifying circuit modifies the default configuration data according to the current state parameter, so that the Management Engine controller initially configures the PCIE ports according to the modified default configuration data. Thus, the dynamical configuration of the chipset PCIE ports is realized.

10 Claims, 4 Drawing Sheets

MAIN BOARD AND METHOD FOR DYNAMICALLY CONFIGURING PERIPERHAL COMPONENT INTERCONNECT EXPRESS PORTS THEREOF

This application claims the benefit of People's Republic of China application Serial No. 201110032115.5, filed Jan. 28, 2011, the subject matter of which is incorporated herein by reference.

BACKGROUND OF THE INVENTION

1. Field of the Invention

The invention relates in general to a computer, and more particularly to a main board and a method for dynamically configuring peripheral component interconnect express (PCIE) ports thereof.

2. Description of the Related Art

Referring to FIG. 1, a schematic diagram of a conventional main board is shown. Conventional main board 10 comprises a read only memory (ROM) 13 and a chipset 14. The chipset 14 combines conventional South-bridge chip and North-bridge chip, and is realized by such as the Cougar Point series provided by Intel. The chipset 14 further comprises a Management Engine (ME) controller 141 and several peripheral component interconnect express (PCIE) ports 142. The ROM 13 stores a default configuration data and a basic input/output system (BIOS). The Management Engine controller 141 reads the default configuration data from the ROM 13 to perform a default initialization configuration on the PCIE ports 142. Then, the chipset 14 again reads the basic input/output system. Detailed descriptions are disclosed in the technical documents of the cougar point series provided by Intel such as in the "Intel 6 series chipset design guide".

Referring to FIG. 2, FIG. 3, FIG. 4 and FIG. 5, schematic diagrams of the default initialization configuration of PCIE ports are shown. Since the Management Engine controller 141 performs a default initialization configuration on the PCIE ports 142 before the chipset 14 reads the basic input/output system, the default initialization configuration of the PCIE ports 142 can only be one of the four types of default initialization configuration illustrated in FIGS. 2~5. FIG. 2 shows the default initialization configured with four 1X PCIE ports 142. FIG. 3 shows the default initialization configured with two 2X PCIE ports 142. FIG. 4 shows the default initialization configured with two 1X PCIE ports 142 and one 2X PCIE port 142. FIG. 5 shows the default initialization configured with one 4X PCIE port 142.

However, the default configuration data cannot be updated by the user once determined. The configuration of the PCIE ports 142 of the chipset 14 is limited to one of the four types of default initialization configuration (illustrated in FIGS. 2-5) disclosed in Intel specifications. Thus, the chipset 14 cannot dynamically update the configuration of the PCIE ports 142 according to the actual situation of card insertion on the main board.

SUMMARY OF THE INVENTION

The invention is directed to a main board and a method for dynamically configuring peripheral component interconnect express (PCIE) ports thereof. Initial configuration is dynamically performed on the PCIE ports according to actual situation of card insertion.

According to a first aspect of the invention, a main board is disclosed. The main board comprises a peripheral component interconnect express (PCIE) slot, a detecting circuit, a read only memory (ROM), a chipset and a modifying circuit. The chipset comprises a Management Engine (ME) controller and several PCIE ports. The detecting circuit detects the PCIE slot to generate a current state parameter. The ROM stores a default configuration data. The modifying circuit coupled between the chipset and the ROM determines whether the default configuration data needs to be modified according to the current state parameter. When the default configuration data needs to be modified, the modifying circuit modifies the default configuration data according to the current state parameter, so that the Management Engine controller initially configures the PCIE ports according to the modified default configuration data.

According to a second aspect of the invention, a method for dynamically configuring peripheral component interconnect express (PCIE) ports is disclosed. The method for dynamically configuring PCIE ports is used in a main board, which comprises a PCIE slot, a chipset and a modifying circuit. The chipset comprises a Management Engine (ME) controller and several PCIE ports. The method for dynamically configuring PCIE ports comprises the following steps: The PCIE slot is detected to generate a current state parameter. Whether the default configuration data needs to be modified is determined according to the current state parameter. When the default configuration data needs to be modified, the modifying circuit modifies the default configuration data according to the current state parameter, so that the Management Engine controller initially configures the PCIE ports according to the modified default configuration data.

The above and other aspects of the invention will become better understood with regard to the following detailed description of the preferred but non-limiting embodiment(s). The following description is made with reference to the accompanying drawings.

DETAILED DESCRIPTION OF THE INVENTION

A main board and a method for dynamically configuring peripheral component interconnect express (PCIE) ports thereof are disclosed in the following embodiments for enabling the main board to dynamically perform adaptive initialization configuration on the PCIE ports according to actual situation of card insertion. The main board comprises a PCIE slot, a detecting circuit, a read only memory (ROM), a chipset and a modifying circuit. The chipset comprises a Management Engine (ME) controller and several PCIE ports. The detecting circuit detects the PCIE slot to generate a current state parameter. The ROM stores a default configuration data. The modifying circuit coupled between the chipset and the ROM determines whether the default configuration data needs to be modified according to the current state parameter. When the default configuration data needs to be modified, the modifying circuit modifies the default configuration data according to the current state parameter, so that the Management Engine controller initially configures the PCIE ports according to the modified default configuration data.

The method for dynamically configuring PCIE ports comprises the following steps: The PCIE slot is detected to generate a current state parameter. Whether the default configuration data needs to be modified is determined according to the current state parameter. When the default configuration data needs to be modified, the modifying circuit modifies the default configuration data according to the current state parameter, so that the Management Engine controller initially configures the PCIE ports according to the modified default configuration data.

Figure 1:
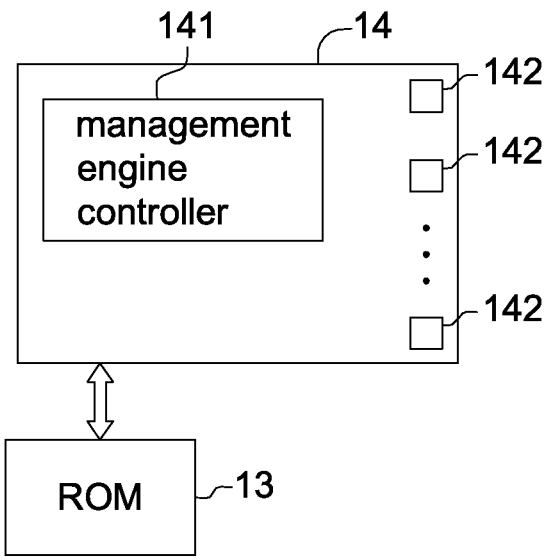
FIG. 1 shows a schematic diagram of a conventional main board.
Figure 2:
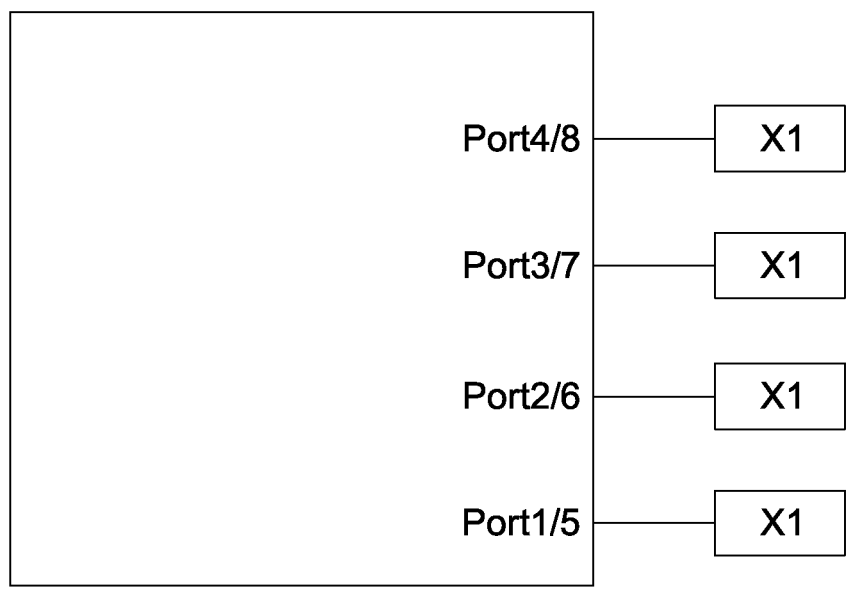
FIGS. 2~5 show schematic diagrams of the default initialization configuration of peripheral component interconnect express (PCIE) ports.
Figure 3:
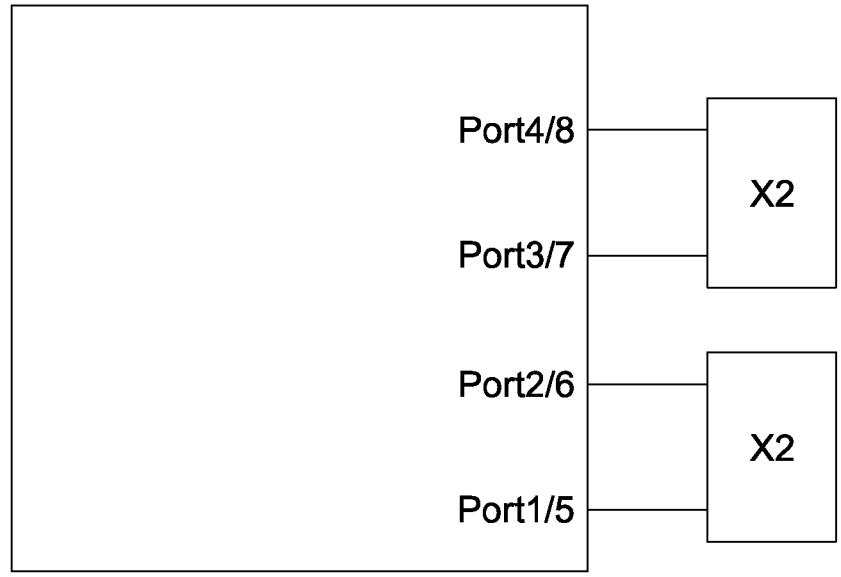
Figure 4:
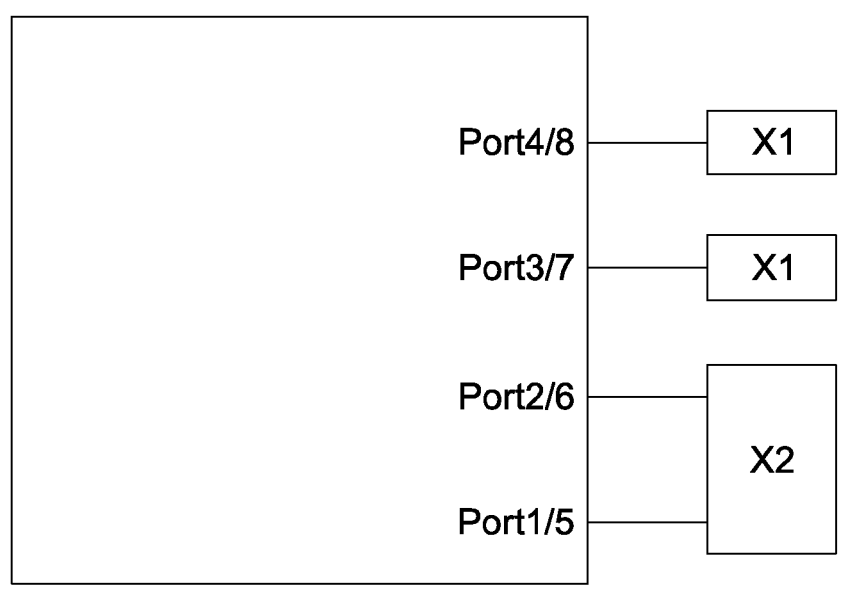
Figure 5:
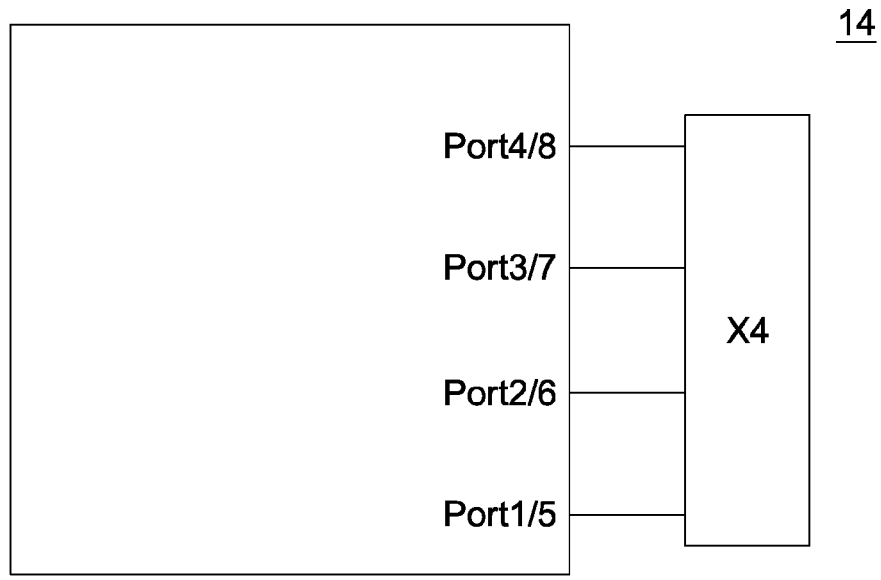
Figure 6:
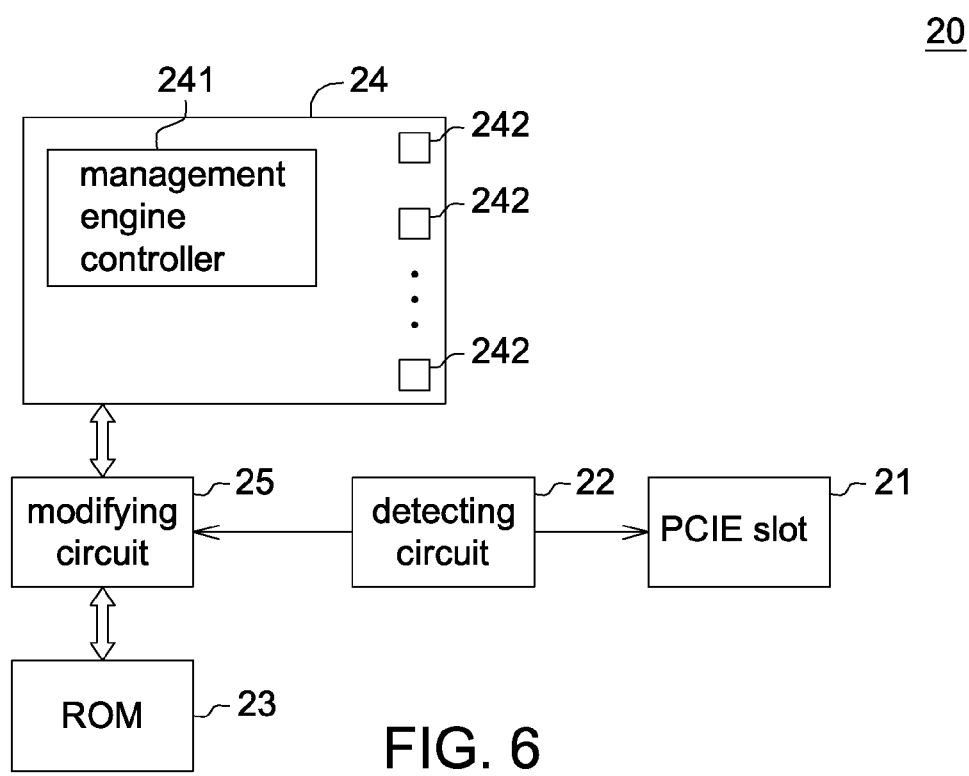
FIG. 6 shows a schematic diagram of a main board according to an embodiment of the invention.
Figure 7:
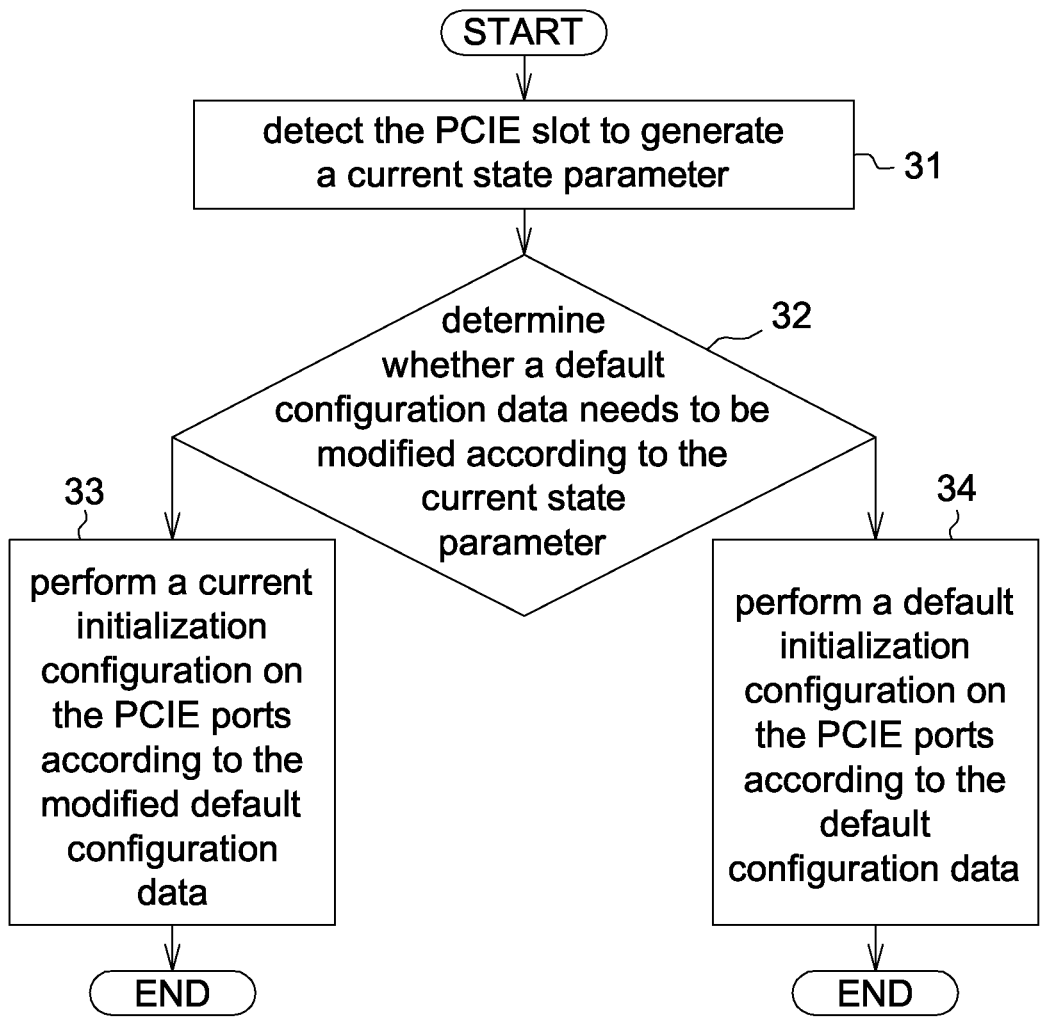
FIG. 7 shows a flowchart of method for dynamically configuring the PCIE ports of a main board according to an embodiment of the invention.

Referring to FIG. 6 and FIG. 7. FIG. 6 shows a schematic diagram of a main board according to an embodiment of the invention. FIG. 7 shows a flowchart of method for dynamically configuring the PCIE ports of a main board according to an embodiment of the invention. The main board 20 comprises a PCIE slot 21, a detecting circuit 22, an ROM 23, a chipset 24 and a modifying circuit 25. The chipset 24 has a Management Engine function or a similar Management Engine function. The chipset 24 is such as the cougar point series provided by Intel. The chipset 24 further comprises a Management Engine (ME) controller 241 and several PCIE ports 242. The PCIE ports 242 output PCIE signals, and the PCIE slot 21 with corresponding transmission rate must have corresponding number of PCIE signals. For example, a 4X PCIE slot 21 must have four pairs of PCIE signals.

The modifying circuit 25 is coupled between the chipset 24 and the ROM 23. The ROM 23, realized by such as a serial peripheral interface (SPI) ROM, stores a default configuration data and a basic input/output system (BIOS). The Management Engine controller 241 reads the default configuration data to perform an initialization configuration on the PCIE slot 21. The Management Engine controller 241 selectively performs a default initialization configuration or a current initialization configuration on the PCIE slot 21 according to whether the default configuration data is modified. The default initialization configuration is such as one of aforementioned configurations illustrated in FIGS. 2~5.

The method for dynamically configuring PCIE ports can be used in the aforementioned main board 20 and at least comprises the following steps: Firstly, as indicated in step 31, the PCIE slot 21 is detected by the detecting circuit 22 to generate a current state parameter. The detecting circuit 22 can generate different configuration status parameters according to actual state of card insertion on the PCIE slot 21. For example, when a 4X PCIE device is inserted into a PCIE slot 21, the detecting circuit 22 will generate a corresponding 4X configuration status parameter. When a 1X PCIE device is inserted into a PCIE slot 21, the detecting circuit 22 will generate a corresponding 1X configuration status parameter. The modifying circuit 25 obtains the current use status on the current PCIE slot 21 from the configuration status parameter. The modifying circuit 25 can be realized by such as a complex programmable logic device (CPLD) or a super input/output (super IO) chip.

Next, as indicated in step 32, whether the default configuration data needs to be modified is determined by the modifying circuit 25 according to the current state parameter. For example, the modifying circuit 25 determines whether the current situation of card insertion on the PCIE slot 21 of the main board 20 matches a default initialization configuration according to the current state parameter. If not matched, this implies that the modifying circuit 25 needs to modify the default configuration data, and the process proceeds to step 33.

Then, as indicated in step 33, the default configuration data is modified by the modifying circuit 25 according to the current state parameter, so that the Management Engine controller 241 performs a current initialization configuration on the PCIE ports 242 according to the modified default configuration data. In other words, the modifying circuit 25 writes the modified default configuration data into the Management Engine controller 241 according to the current state parameter before the chipset 24 reads the basic input/output system, so that the Management Engine controller 241 performs a current initialization configuration on the PCIE ports 242 in response to actual situation of card insertion.

To further make use of the chipset 24, some signals of the PCIE slot 21 are shared, and the sharing can be realized by a PCIE switch integrated circuit. For example, four 1X PCIE slots 21 and one 4X PCIE slot 21 share signals. When a 4X-above device is inserted into a 4X PCIE slot 21, the chipset 24 is configured with a 4X PCIE port 242, which will be electrically connected to a corresponding 4X PCIE slot 21 via a PCIE switch integrated circuit for performing 4X PCIE signal transmission. Meanwhile, other four 1X PCIE slots having not any signals cannot be put into use.

To the contrary, if the current situation of card insertion on the PCIE slot 21 of the main board 20 matches one of the four types of default initialization configuration defined in the Intel specifications, this implies that the modifying circuit 25 does not need to modify the default configuration data, and the process proceeds to step 34. As indicated in step 34, the modifying circuit 25 outputs the default configuration data to the Management Engine controller 241, so that the Management Engine controller 241 performs a default initialization configuration on the PCIE ports 242 according to the default configuration data.

The aforementioned main board 20 and the method for dynamically configuring PCIE ports thereof are capable of flexibly performing initialization configuration on the PCIE ports 242 in response to actual situation of card insertion on the PCIE slot 21, hence further enriching the function of the main board 20. Besides, the user is given more choices in assembling a computer, and the product competitiveness of the main board 20 is thus increased.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A main board, comprising:
a peripheral component interconnect express (PCIE) slot;
a detecting circuit used for detecting the PCIE slot to generate a current state parameter;
a read only memory (ROM) used for storing a default configuration data;
a chipset, comprising:
a plurality of PCIE ports; and
a Management Engine (ME) controller;
a modifying circuit coupled between the chipset and the ROM for determining whether the default configuration data needs to be modified according to the current state parameter, wherein when the default configuration data needs to be modified, the modifying circuit modifies the default configuration data according to the current state parameter, so that the Management Engine controller performs a current initialization configuration on the PCIE ports according to the modified default configuration data.

2. The main board according to claim 1, wherein when the default configuration data does not need to be modified, the modifying circuit outputs the default configuration data to the Management Engine controller, so that the Management Engine controller performs a default initialization configuration on the PCIE ports according to the default configuration data.

3. The main board according to claim 1, wherein the ROM further stores a basic input/output system (BIOS), and when the default configuration data needs to be modified, the modifying circuit modifies the default configuration data according to the current state parameter before the chipset reads the basic input/output system.

4. The main board according to claim 1, wherein the modifying circuit is a complex programmable logic device (CPLD).

5. The main board according to claim 1, wherein the modifying circuit is a super input/output (super IO) chip.

6. A method for dynamically configuring PCIE ports, wherein the method is used in a main board, which comprises a peripheral component interconnect express (PCIE) slot, a chipset and a modifying circuit, the chipset comprises a plurality of PCIE ports and a Management Engine (ME) controller, and the method for dynamically configuring PCIE ports comprises:

detecting the PCIE slot to generate a current state parameter;

determining whether a default configuration data needs to be modified according to the current state parameter;

modifying the default configuration data by the modifying circuit according to the current state parameter when the default configuration data needs to be modified, so that the Management Engine controller performs a current initialization configuration on the PCIE ports according to the modified default configuration data.

7. The method for dynamically configuring PCIE ports according to claim 6, further comprising:

outputting the default configuration data to the Management Engine controller by the modifying circuit when the default configuration data does not need to be modified, so that the Management Engine controller performs a default initialization configuration on the PCIE ports according to the default configuration data.

8. The method for dynamically configuring PCIE ports according to claim 6, wherein when the default configuration data needs to be modified, the modifying circuit modifies the default configuration data according to the current state parameter before the chipset reads a basic input/output system (BIOS).

9. The method for dynamically configuring PCIE ports according to claim 6, wherein the modifying circuit is a complex programmable logic device (CPLD).

10. The method for dynamically configuring PCIE ports according to claim 6, wherein the modifying circuit is a super IO chip.

\* \* \* \* \*